US011069379B2

(12) United States Patent
Lancaster

(10) Patent No.: US 11,069,379 B2
(45) Date of Patent: Jul. 20, 2021

(54) INTELLIGENT PRINT RECOGNITION SYSTEM AND METHOD

(71) Applicant: BrandActif Ltd., Easingwold (GB)

(72) Inventor: Peter Lancaster, Harrogate (GB)

(73) Assignee: BRANDACTIF LTD., Easingwold (GB)

( * ) Notice: Subject to any disclaimer, the term of this patent is extended or adjusted under 35 U.S.C. 154(b) by 0 days.

(21) Appl. No.: 16/705,116

(22) Filed: Dec. 5, 2019

(65) Prior Publication Data

US 2020/0111508 A1    Apr. 9, 2020

Related U.S. Application Data

(63) Continuation of application No. 15/694,724, filed on Sep. 1, 2017, now Pat. No. 10,504,556, which is a
(Continued)

(51) Int. Cl.
| | |
|---|---|
| *G11B 27/028* | (2006.01) |
| *H04N 1/32* | (2006.01) |
| *H04N 5/76* | (2006.01) |
| *H04N 1/387* | (2006.01) |
| *G11B 31/00* | (2006.01) |

(52) U.S. Cl.
CPC .......... *G11B 27/028* (2013.01); *G11B 31/006* (2013.01); *H04N 1/32144* (2013.01); *H04N 1/3871* (2013.01); *H04N 5/7605* (2013.01); *H04N 2201/3249* (2013.01)

(58) Field of Classification Search
CPC .. G06F 16/9535; G06F 16/435; G06F 16/219; G06F 16/288; G06F 16/71; G06F 16/735; G06F 3/0482; G06F 3/0484; G06F 16/4387; G06F 16/444; G06F 16/7867; G06F 1/1626; G06F 1/1694; G06F 3/01; G06F 3/011; G06F 3/04815; G06F 3/04842; G06F 16/436; G06F 16/437; G06F 8/38; G06F 16/9574; G06F 19/328; G06F 21/6245; G06F 21/6263; G06F 21/79; G06F 3/04847; G06K 9/00302; G06K 9/00711; H04H 60/33; H04H 60/65; H04H 20/106;
(Continued)

(56) References Cited

U.S. PATENT DOCUMENTS

| | | | |
|---|---|---|---|
| 5,188,264 A | 2/1993 | Young, Sr. | |
| 5,188,624 A | 2/1993 | Young, Sr. et al. | |

(Continued)

FOREIGN PATENT DOCUMENTS

| | | |
|---|---|---|
| CN | 101600118 B | 9/2012 |
| CN | 106127469 A | 11/2016 |

(Continued)

*Primary Examiner* — Negussie Worku
(74) *Attorney, Agent, or Firm* — DLA Piper LLP (US)

(57) ABSTRACT

A system and method for interactive printed media are disclosed in which a mobile or wearable computing device has an application that captures an image of a piece of printed media and associates a link to the piece of printed media using a backend component to make the piece of printed media interactive. The system and method may be used to generate a piece of printed media that is interactive that may be sent to third parties or to make an existing piece of printed media interactive.

12 Claims, 12 Drawing Sheets

Related U.S. Application Data continuation of application No. 14/518,796, filed on Oct. 20, 2014, now Pat. No. 9,754,623, which is a continuation of application No. 13/797,942, filed on Mar. 12, 2013, now Pat. No. 8,867,106.

(60) Provisional application No. 61/609,699, filed on Mar. 12, 2012.

(58) Field of Classification Search
CPC .... H04H 20/93; H04H 2201/37; H04H 60/45; H04H 60/46; H04H 60/63; H04H 20/10
USPC ....................................................... 358/1.15
See application file for complete search history.

(56) References Cited

U.S. PATENT DOCUMENTS

| | | |
|---|---|---|
| 5,661,517 A | 8/1997 | Budow |
| 5,854,894 A | 12/1998 | Lancaster |
| 6,175,663 B1 * | 1/2001 | Huang .................. G06T 11/60 345/589 |
| 6,587,599 B1 | 7/2003 | Huang |
| 6,826,727 B1 | 11/2004 | Mohr |
| 6,914,593 B2 | 7/2005 | Lapstun et al. |
| 7,030,642 B2 * | 4/2006 | Butsch ................. G01R 1/0416 324/750.09 |
| 7,406,603 B1 | 7/2008 | MacKay |
| 7,466,444 B2 | 12/2008 | Silverbrook |
| 7,495,795 B2 | 2/2009 | Graham |
| 7,739,583 B2 | 6/2010 | Barrus |
| 7,746,498 B2 | 6/2010 | Lapstun et al. |
| 7,812,986 B2 | 10/2010 | Graham et al. |
| 7,930,642 B1 * | 4/2011 | Gerde ..................... H04N 1/40 715/764 |
| 7,962,691 B2 | 6/2011 | Nishihara |
| 7,982,898 B2 | 7/2011 | Lapstun et al. |
| 7,991,778 B2 | 8/2011 | Hull et al. |
| 8,090,628 B2 | 1/2012 | Shinohara |
| 8,156,427 B2 | 4/2012 | Graham et al. |
| 8,271,413 B2 | 9/2012 | Agarwal et al. |
| 8,310,985 B2 | 11/2012 | Harb |
| 8,332,401 B2 | 12/2012 | Hull et al. |
| 8,335,789 B2 | 12/2012 | Hull et al. |
| 8,385,660 B2 | 2/2013 | Moraleda et al. |
| 8,390,648 B2 | 3/2013 | Ptucha et al. |
| 8,438,485 B2 | 5/2013 | Kulis et al. |
| 8,601,526 B2 | 12/2013 | Nishimuyra |
| 8,635,531 B2 | 1/2014 | Graham |
| 8,681,243 B2 | 3/2014 | Nozaki |
| 8,682,722 B1 | 3/2014 | Des Jardins |
| 8,797,604 B2 | 8/2014 | Hannaway |
| 8,843,963 B2 | 9/2014 | Boylan, III et al. |
| 8,867,106 B1 * | 10/2014 | Lancaster ............ H04N 1/3871 358/474 |
| 9,036,043 B2 | 5/2015 | Segal |
| 9,092,291 B1 | 7/2015 | Adib |
| 9,219,840 B2 | 12/2015 | Ashbrook et al. |
| 9,223,782 B2 | 12/2015 | Ashbrook et al. |
| 9,319,640 B2 | 4/2016 | Ptucha et al. |
| 9,332,302 B2 | 5/2016 | Briggs |
| 9,338,493 B2 | 5/2016 | van Os et al. |
| 9,363,448 B2 | 6/2016 | Segal |
| 9,418,294 B2 | 8/2016 | Ashbrook et al. |
| 9,448,625 B2 | 9/2016 | Kobayashi |
| 9,652,783 B2 | 5/2017 | Roberts et al. |
| 9,656,492 B2 | 5/2017 | Leynadier |
| 9,659,313 B2 | 5/2017 | Tsai et al. |
| 9,715,629 B2 | 7/2017 | Ashbrook et al. |
| 9,754,623 B2 | 9/2017 | Lancaster |
| 9,979,758 B2 | 5/2018 | Duncker |
| 10,120,944 B2 | 11/2018 | Hu et al. |
| 10,142,687 B2 | 11/2018 | Gurha |
| 10,158,722 B2 | 12/2018 | Eschbach et al. |
| 10,231,033 B1 | 3/2019 | Bumgarner et al. |
| 10,291,947 B2 | 5/2019 | Bhatia et al. |
| 10,445,618 B2 | 10/2019 | Ashbrook et al. |
| 10,504,556 B2 | 12/2019 | Lancaster |
| 2002/0184091 A1 | 12/2002 | Pudar |
| 2003/0070167 A1 | 4/2003 | Holtz et al. |
| 2004/0019497 A1 | 1/2004 | Volk et al. |
| 2004/0047294 A1 | 3/2004 | Ain |
| 2004/0095376 A1 | 5/2004 | Graham |
| 2004/0098671 A1 | 5/2004 | Graham |
| 2004/0193571 A1 | 9/2004 | Barrus |
| 2005/0246590 A1 | 11/2005 | Lancaster |
| 2007/0288976 A1 | 12/2007 | Redling et al. |
| 2008/0052194 A1 | 2/2008 | Shinohara |
| 2008/0262911 A1 | 10/2008 | Altberg |
| 2009/0047000 A1 | 2/2009 | Walikis et al. |
| 2009/0150941 A1 | 6/2009 | Riedl et al. |
| 2009/0210790 A1 | 8/2009 | Thomas |
| 2009/0313658 A1 | 12/2009 | Nishimura |
| 2010/0146135 A1 | 6/2010 | Evans et al. |
| 2010/0280641 A1 | 11/2010 | Harkness et al. |
| 2010/0280921 A1 * | 11/2010 | Stone ................. G06Q 30/0603 705/27.1 |
| 2010/0286490 A1 | 11/2010 | Koverzin |
| 2011/0035394 A1 | 2/2011 | Ashbrook et al. |
| 2011/0157221 A1 | 6/2011 | Ptucha et al. |
| 2011/0157226 A1 | 6/2011 | Ptucha et al. |
| 2012/0072943 A1 | 3/2012 | Pan |
| 2012/0159327 A1 | 6/2012 | Law et al. |
| 2012/0173388 A1 | 7/2012 | Odinak et al. |
| 2012/0274105 A1 | 11/2012 | Chen et al. |
| 2012/0317492 A1 * | 12/2012 | Sheeder ........... H04N 21/25891 715/738 |
| 2013/0034147 A1 | 2/2013 | Ballout |
| 2013/0036007 A1 | 2/2013 | Lau et al. |
| 2013/0173402 A1 | 7/2013 | Young et al. |
| 2013/0254159 A1 | 9/2013 | Thramann et al. |
| 2014/0036088 A1 | 2/2014 | Gabriel |
| 2014/0164091 A1 * | 6/2014 | Hunt .................... G06Q 20/342 705/14.32 |
| 2014/0198033 A1 | 7/2014 | Kobayashi |
| 2014/0245346 A1 | 8/2014 | Cheng et al. |
| 2015/0033255 A1 | 1/2015 | Neumann et al. |
| 2015/0162997 A1 | 6/2015 | Francois et al. |
| 2015/0213439 A1 * | 7/2015 | Kramer ................ G06Q 20/347 235/380 |
| 2015/0270318 A1 | 9/2015 | Bhintade |
| 2015/0271234 A1 | 9/2015 | O'Malley et al. |
| 2015/0358790 A1 | 12/2015 | Nasserbakht |
| 2016/0094302 A1 | 3/2016 | Berner et al. |
| 2016/0182923 A1 * | 6/2016 | Higgs .............. H04N 21/23424 725/34 |
| 2016/0316233 A1 | 10/2016 | Ghadi et al. |
| 2016/0351062 A1 | 12/2016 | Mathews |
| 2017/0200193 A1 * | 7/2017 | Bigley ............... G06Q 30/0621 |
| 2018/0054639 A1 | 2/2018 | Rosqvist |
| 2018/0122378 A1 | 5/2018 | Mixter et al. |
| 2018/0190264 A1 | 7/2018 | Mixter et al. |
| 2018/0261223 A1 | 9/2018 | Jain et al. |
| 2019/0066190 A1 * | 2/2019 | Pedroso ............ G06Q 30/0621 |
| 2019/0313135 A1 | 10/2019 | Pathak et al. |
| 2020/0104844 A1 * | 4/2020 | Herrington ........... H04L 9/0625 |
| 2020/0242585 A1 * | 7/2020 | Meere ................. G06Q 20/401 |

FOREIGN PATENT DOCUMENTS

| | | |
|---|---|---|
| CN | 103905846 B | 12/2017 |
| EP | 1847112 B1 | 6/2013 |
| WO | WO2002082351 A1 | 10/2002 |
| WO | WO2005/039080 A1 | 4/2005 |

* cited by examiner

INTELLIGENT PRINT RECOGNITION SYSTEM AND METHOD

PRIORITY CLAIM/RELATED APPLICATION

This application is a continuation of and claims priority and benefit under 35 USC 120 to U.S. patent application Ser. No. 15/694,724, filed Sep. 1, 2017 that in turn is a continuation of and claims priority and benefit under 35 USC 120 to U.S. patent application Ser. No. 14/518,796, filed Oct. 20, 2014 that in turn is a continuation of and claims priority and benefit under 35 USC 120 to U.S. patent application Ser. No. 13/797,942 filed on Mar. 12, 2013 (issued on Oct. 21, 2014 as U.S. Pat. No. 8,867,106) that in turn claims the benefit and priority under 35 USC 119(e) and 120 to U.S. Provisional Patent Application Ser. No. 61/609,699 filed on Mar. 12, 2012 and entitled "Intelligent Print Recognition", the entirety of all of which are incorporated herein by reference.

FIELD

The disclosure relates generally to a system and method for making a piece of print interactive.

BACKGROUND

Machine readable codes such as QR Codes, NFC, Watermarks and the like require that the code is designed into the piece before printing or added as a sticker. This restricts its use to new print that must be produced, distributed, placed, hung, installed etc.

Image Recognition systems require a digital file such as a PDF to be uploaded, indexed etc. via a computer before the image can be made interactive. In most instances, if an image is to link to a video, a still image from the video must be printed out to be the 'marker' file to access the video through Image Recognition.

There is a need for a more dynamic and user-friendly way to create user-generated interactive print.

DETAILED DESCRIPTION OF ONE OR MORE EMBODIMENTS

Figure 1:
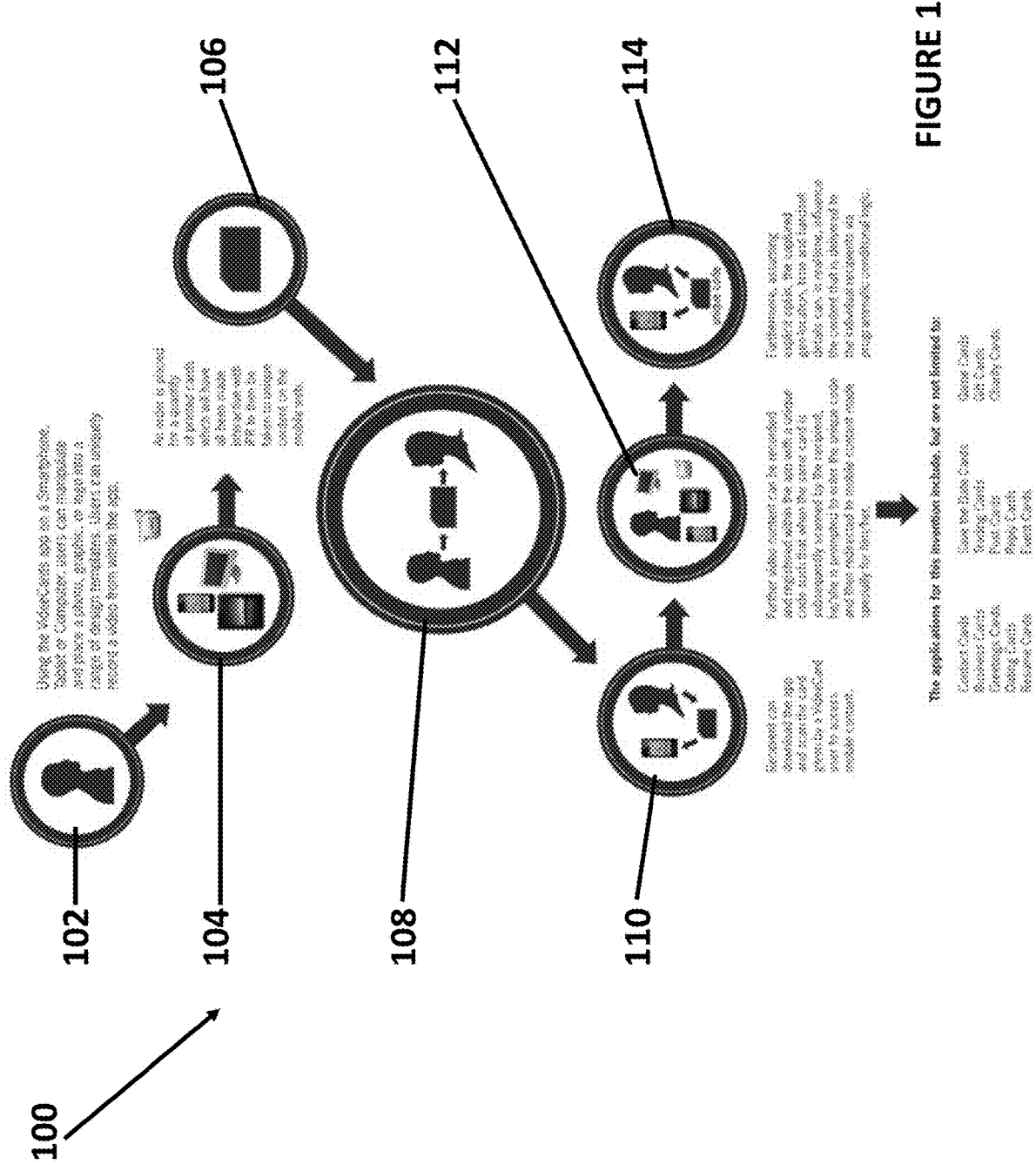
FIG. 1 illustrates a method for printed media association using the intelligent print recognition.

The disclosure is particularly applicable to a cloud based system used for images with computing device having applications that interact with the cloud based system and it is in this context that the disclosure will be described. It will be appreciated, however, that the system and method has greater utility since it can be implemented in ways no specifically described below that are within the scope of the disclosure.

The system and method broadly allows print to made digital. Specifically, a digitised version of the printed piece of media is held in a backend of the system along with relevant metadata. When a piece of print media is scanned, such as using a enabled application running on a computing device in one implementation, a print recognition process in the backend searches for a match in a store, such as a database in one implementation, and performs a programmed action to direct the user to the required online destination for the digital media associated with the piece of printed media.

In one implementation, the system may have an application, such as a VideeCards app, on each computing device, such as a Smartphone, Tablet or Computer and then users can manipulate and place a photo, graphic or logo into a range of design templates. The application may also allow the user to edit text and graphics and/or record a video (or link to any existing video already stored on the computing device or other online content). The system also allows the user to place an order for a quantity of printed media that will have been made interactive by the system so that anyone scanning the piece of printed media with the computing device, such as by the VideeCards App being executed on the computing device, may be taken to the video or other predetermined content. The system may also further video content to be recorded and registered within the app such that when the card is subsequently scanned, the user will be taken to the new video. Additionally, the system allows customised and personalised content to be created and given a unique code. The code can be given to the targeted individual recipient such that when the generic card is scanned, the user is now prompted to enter the unique code and is then directed to the video (or other content) made especially for them. Furthermore, assuming explicit opt-in, the captured geo-location, time and handset details can, in real-time, influence the content that is delivered to individual recipients via programmatic conditional logic.

The piece of print media that may be made interactive by the system may include, but is not limited to, posters, paintings, contact cards, business cards, greetings cards, dating cards, resume cards, save the date cards, trading cards, postcards, reply cards, event cards, game cards, gift cards, charity cards etc. The interactive user-generated content concept also applies in the same way to 'photo-merchandise' products such as photo-books, canvas prints, hats, mugs, t-shirts, pillows, cushions, bags, fridge magnets, bumper stickers, labels, paintings, coasters, photo-jigsaws. More generally, the system may be used to make any existing piece of printed media interactive.

FIG. 1 illustrates a method 100 for printed media association using the intelligent print recognition. In a first process 102, a user of the system may create a customized piece of printed media. In one implementation, a user may use a VideeCards App on a computing device and the user is presented with a series of design templates grouped by genre (including but not limited to Greetings Cards, Contact Cards, Business Cards, Postcards, PhotoBooks, T-Shirts etc) into which the user may insert a photo, graphic and/or logo. The user interface may also permit the user to record a video (process 104) that will be associated with the piece of print media. Once the piece of printed media for the user is completed, the user may order a predetermined number of the piece of printed media (process 106) each of which is interactive as described below in more detail. The user may then send the pieces of printed media to third parties (process 108.) The recipient may then download the application and the scan the piece of printed media (process 110) so that the recipient can access the interactive content, such as a video, associated with the piece of printed media. The recipient may also enter a unique code to be able to view a video recorded for the recipient (process 112). If the recipient has opted-in to the system, then the system may also deliver the interactive content based on the location or the recipient and the like (process 114.)

Figure 2:
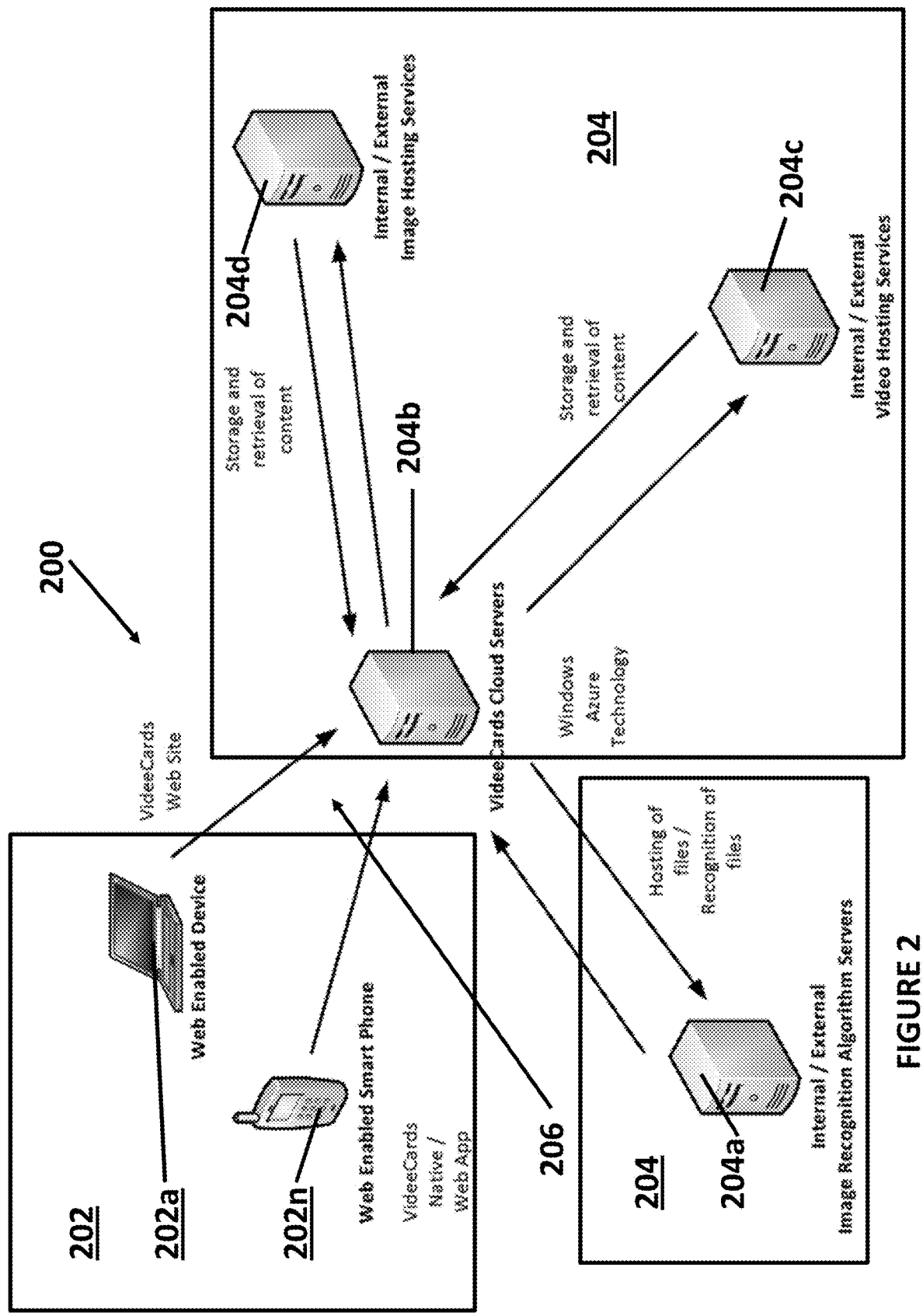
FIG. 2 is a diagram illustrating an implementation of a system for intelligent print recognition and print media association.

FIG. 2 is a diagram illustrating an implementation of a system 200 for intelligent print recognition and print media association. The system may have one or more computing devices 202 that are capable of connecting to a backend 204 over a communications path 206. Each computing device 202 may be a processor based device with memory, a display, an imaging device, such as a camera, and wired or wireless connectivity that allows the computing device to connect to the back end 204 and then interact with the backend. The computing device may also be a mobile computing device or a wearable computing device. For example, each computing device may be a personal computer, a tablet computer, a smartphone device, such as a device based on iOS, Android or the Symbian operating systems, a camera, Google® glasses or any other wearable computing device and any other web enabled device that is capable of interacting with the backend. As shown in FIG. 2, one implementation of a computing device 202a may be a computing device that is executing a browser application stored in the memory of the computing device that access a web site of the backend (by way of a web server) and then interact with the backend using web pages to exchange data with the backend. In another implementation, a computing device 202n may be a smartphone device that stores an application or web app in its memory that is then executed by the processor of the computing device and uses the application or web app to interact with the backend and exchange data with the backend. Examples of the user interfaces displayed on the computing devices are in FIGS. 4A-8F that are described below in more detail.

The communication path 206 may couple the computing devices to the backend and some of the backend systems to each other. The communication path 206 may be a wired communications network or a wired communication network. For example, the communication path 206 may be Ethernet, the web, a wireless data network, a computer network, a wired data network and the like.

The backend 204 may be implemented as one or more computing resources, such as cloud computing resources and server computers and each computing resource may have the typical components of the computing resource including one or more processors, memory, persistent storage and the like. The backend system 204 may further comprise an image recognition component 204a, a cloud component 204b, a video hosting component 204c and an image hosting component 204d. Each of the components of the system may be implemented using one or more computing resources and may be internal to the backend or external to the backend. In one embodiment, the image recognition component 204a, various image recognition providers can be used depending on the content or preference of the customer (for white labeled solutions). In one embodiment, the cloud component 204b may be hosted within Microsoft Azure utilizing both web and database functionality and may be geo-located in terms of redundancy for maximum availability. In one embodiment, the video and image components 204c, 204d may use various Video and Image hosting providers depending on the content and preference of the customer (for white labeled solutions). The images and videos could be stored at a later date within the VideeCards cloud server infrastructure.

The image recognition component 204a may host each file of the users that has a mark in it for the interactive content and may also store/host one or more image recognition processes that are used, based on a scan of a piece of printed media, to detect the mark on the piece of printed media and then provide one or more pieces of interactive content to a recipient of the piece of printed media. The cloud component 204b may perform the user registration and authentication processes, authenticate each computing device and provide a web server that allow a browser application to interact with the backend system. The cloud component 204b may also have a manager component that manages the overall operation of the system. The video and image components 204c, 204d store images and videos, respectively and allow the cloud component 204b to retrieve the images and videos as needed.

The system to create interactive printed media shown in FIG. 2 may be used in different manners. For example, the system may be used to generate a piece of printed media that is interactive that may be sent to third parties as described with reference to FIGS. 3-5B. The system also may be used to take a photo of an existing piece of printed media and then make that existing piece of printed media interactive as described with reference to FIGS. 6A-6C. An example of each of the purposes is also provided below. In both of these uses of the system, the capture of the piece of printed media or the generation of the printed media and making the piece of printed media interactive occurs using the application on the computing device. Now, a method to generate a piece of printed media that is interactive that may be sent to third parties.

Generating a Piece of Interactive Printed Media

Figure 3:
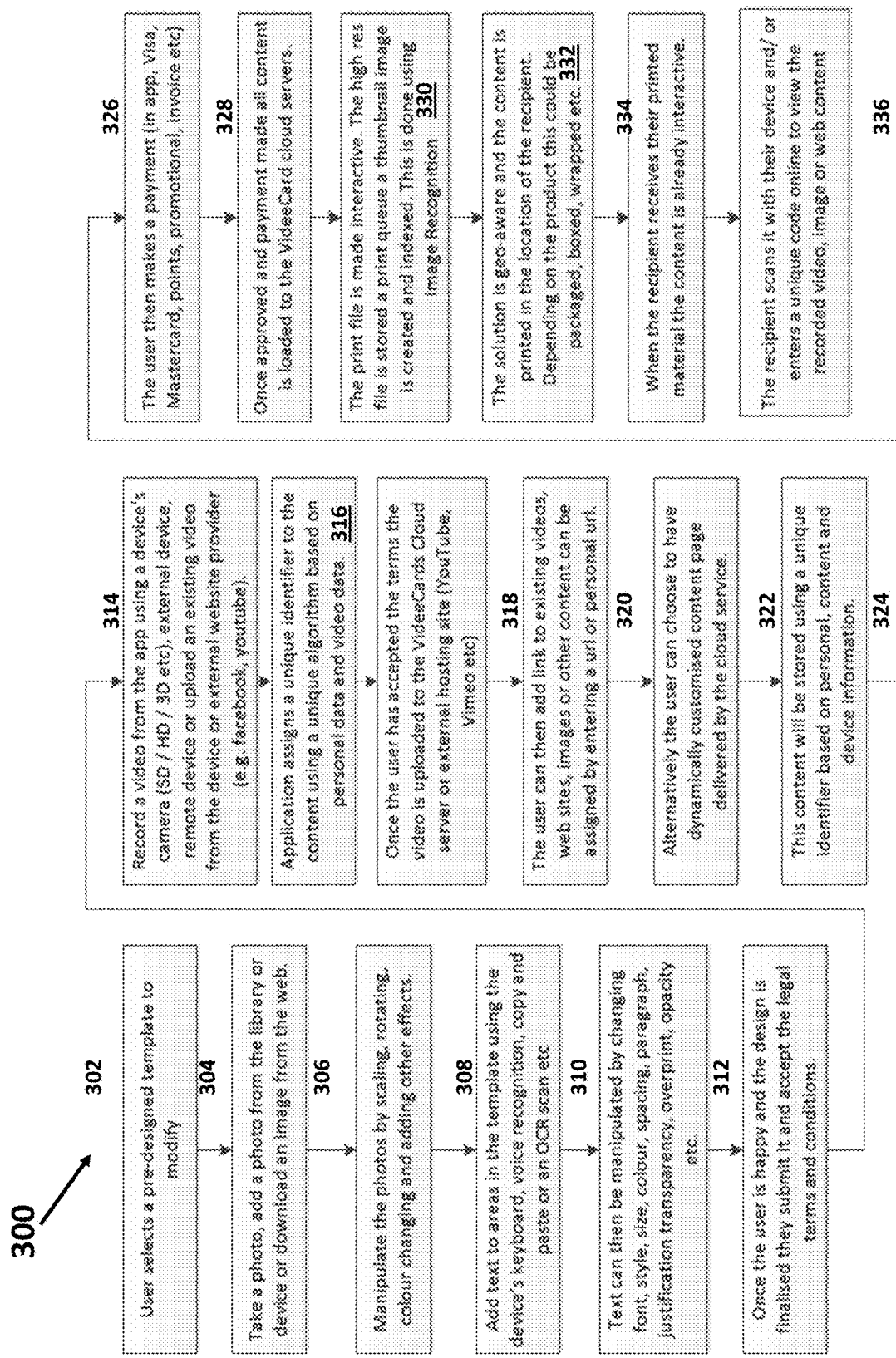
FIG. 3 is a flowchart of a first method for intelligent print recognition.
Figure 4B:
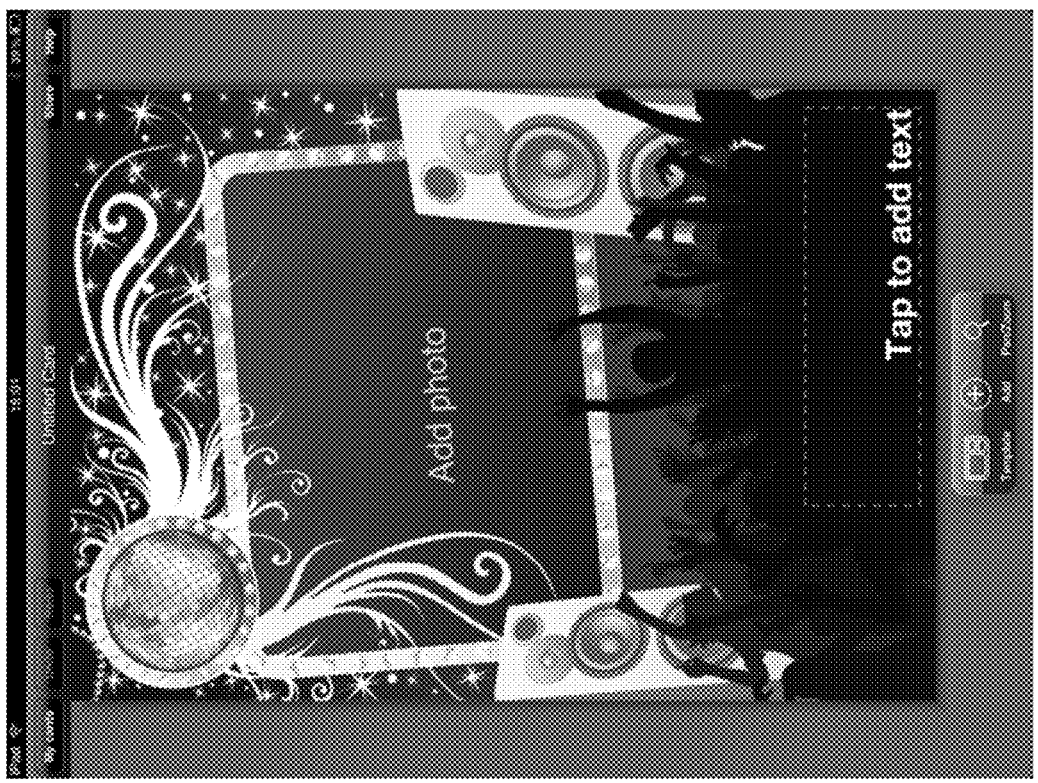
FIGS. 4A-4D are user interface examples of a user customizing a piece of print media.
Figure 4A:

FIG. 3 is a flowchart of a method 300 for intelligent print recognition. In the method, the user, such as by using a computing device, selects a template for the piece of printed media to modify (302). Each template may have one or more predefined area(s), such as shown in FIG. 4B, into which a user's own photo(s), logos or graphic files resident in their device can be placed by the app (such as by tapping inside template to add photo from library, take a photo or download licensed imagery from the web) (304). The images/photos can be (including but not limited to) scaled, cropped, rotated, skewed, masked, brushed, ghosted, color corrected, sharpened, mirrored, negative, grey scale, sepia, drop shadow effects (306). The user may also add text to areas of the template, such as shown in FIG. 4A, using various mechanisms. Thus, the user has control over text and graphics manipulation, allowing free form text to be entered via the (including but not limited to) device keyboard, speech recognition system, cut and paste and OCR (Optical Character Recognition) scan (308.) The test may then be manipulated (310) by adjusting one or more of font, style, size, color, letter spacing, line spacing, leading, kerning, skew, warp, wrap, flow, hyphenation, justification, paragraph, multiple page, indent, superscript, hyperlink, mask, overprint, transparency, opacity etc. Once a design is finalised by the user, a final 'proof' is displayed and a check box is ticked to denote that the user is happy that all content has been reviewed, accepted and that it conforms to all the legal terms and conditions as defined in-app before moving on to the next phase (312.)

The user may then record a video (314) which activates and interacts with (including but not limited to) any on-board SD, HD or 3D video camera, external wirelessly connected and controlled remote video camera or other such device. Once recorded or captured, the video is given a unique reference by the system, such as the application running on the computing device, including but not limited to UDID—Unique Device Identifier—username, password, randomly generated and data based identifier consisting of 4/5/6/7/8 letters and numbers of upper and lower case etc. (316.) In one embodiment, the method may assign the unique identifier based on personal data of the user and the content of the video data. This video, upon accepting the legal terms and conditions of use and upon payment, is then ready to be uploaded (318) to the cloud component 204*b* or an external video-hosting site 204*c* including (but not limited to) YouTube, Vimeo and Video Streaming services.

The user may then add one or more links to videos, web sites, images or other content (320). The link may be assigned by entering a URL, or pURL (personalised URL generator). This can be content that can be generated on the fly, and based on parameters captured in real-time from the scanning system. The parameters may include, but is not limited to, GPS data, handset type, Operating System, time, repeat or unique visitor, API Key etc. Using conditional logic, unique data can be delivered to the handset—'if this then do that'. Should the user scanning elect to 'opt in' and give personal data (including but not limited to) name, e-mail, physical address, membership number or other such identifier, then the UDID of the handset can be linked to the individual user in a database such that the data delivered upon scanning can be personalised to the known individual based upon API Key and/unique index that is scanned. In this way, unlimited copies of the same printed piece can lead those that scan the print to completely customized and personalized content (322), such as (including but not limited to) targeted coupons, customized rewards, prize draws, personal messages. The content for the user may be stored and indexed using the unique identifier based on personal information of the user, content information and device information (324.)

Once the Print file and video have been created, Ts & Cs accepted and payment is made (326) via (including but not limited to) In-App purchase, PayPal, Visa, MasterCard, Purchasing Card, Points, or given free as a promotion, via product code, sponsorship package etc., the Print file may then be uploaded to the cloud component 204B (328) where the Print file is made interactive (330). The piece of printed media file is interactive and a high resolution Print file is stored in a Print queue and a lower resolution, such as for example a jpeg file, is created and 'indexed' using a mark. The mark may be based on an Image Recognition process or an invisible digital watermark such that the visual attributes of the (eventually) printed piece can be subsequently recognized by the 'scanning' system(s) within the system together with (including but not limited to) the associated nomenclature, programmed URL destination and metadata. These 'indexed' files are associated with an 'API Key', (including but not limited to) an alphanumeric database 'partition' such that the indexed files on one Key may be isolated from those on another so that the 'Scanning' App can be made to be associated only with that Key (or such Keys that are required). In this way, the VideeCards App may be 'White Labelled' such that other brands may have their own version under their own brand. Indexed files under one brand may then be private, such that another version of the 'Scanning' system could not read another's files, only its own (unless a brand wished for its files to appear in multiple Keys). An example of this would be a branded version of the VideeCards App for Greetings Cards companies where they use their own copyright designs made suitable for use within the App. Similarly, a Football Club (including but not limited to) could have its own branded version where its own licensed merchandise and imagery is uniquely interactive on a private API Key for use only with the Club's version of the App.

When the design and video are finished and paid for, the digital file will be printed, boxed and shipped (332). Upon receipt, the Cards are interactive (334) such that, when scanned with the VideeCards App or relevant branded version, the user will be taken to the specified and/or dynamic online content, based upon the programmed parameters (such as location, time etc).

When presenting a Card to another individual, the Card owner will instruct the recipient how to download and scan the Card, and give a reason and motivation for them to do so. In this way, the recipients would have the capability to create their own Cards. Should a recipient then subsequently order, their UDID could be linked to the first person whose card was scanned, thereby creating an opportunity for a single layer of incentive commission. This will take the form of 'credits' against future orders.

Figure 4D:
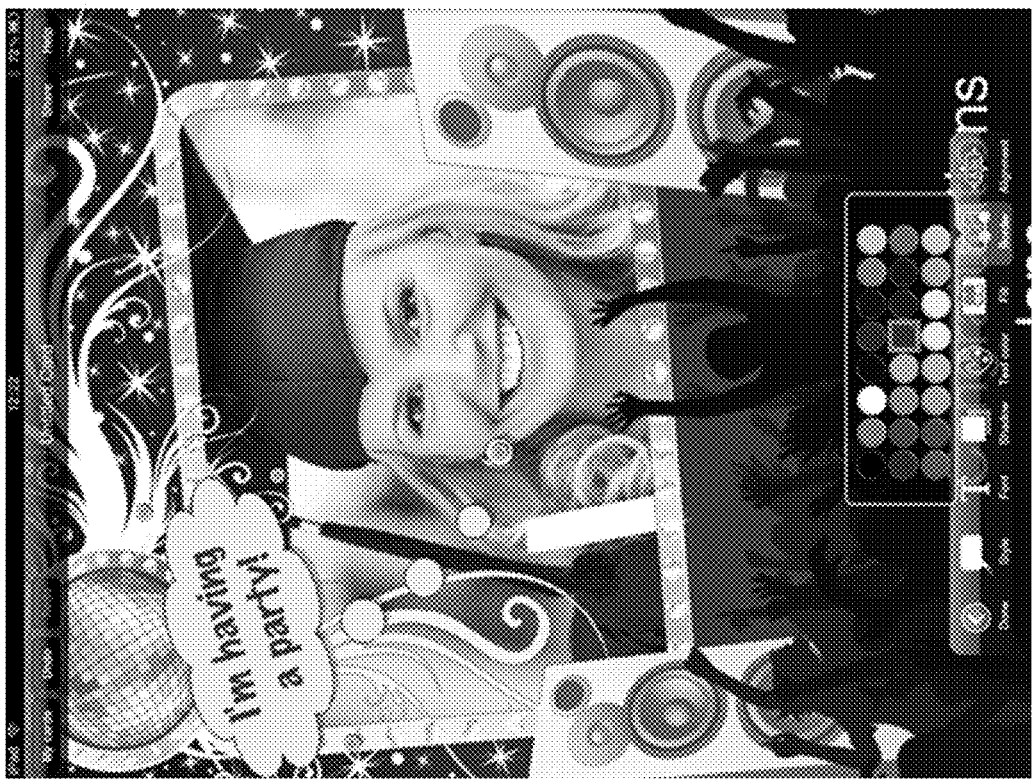
Figure 4C:
Figure 5A:
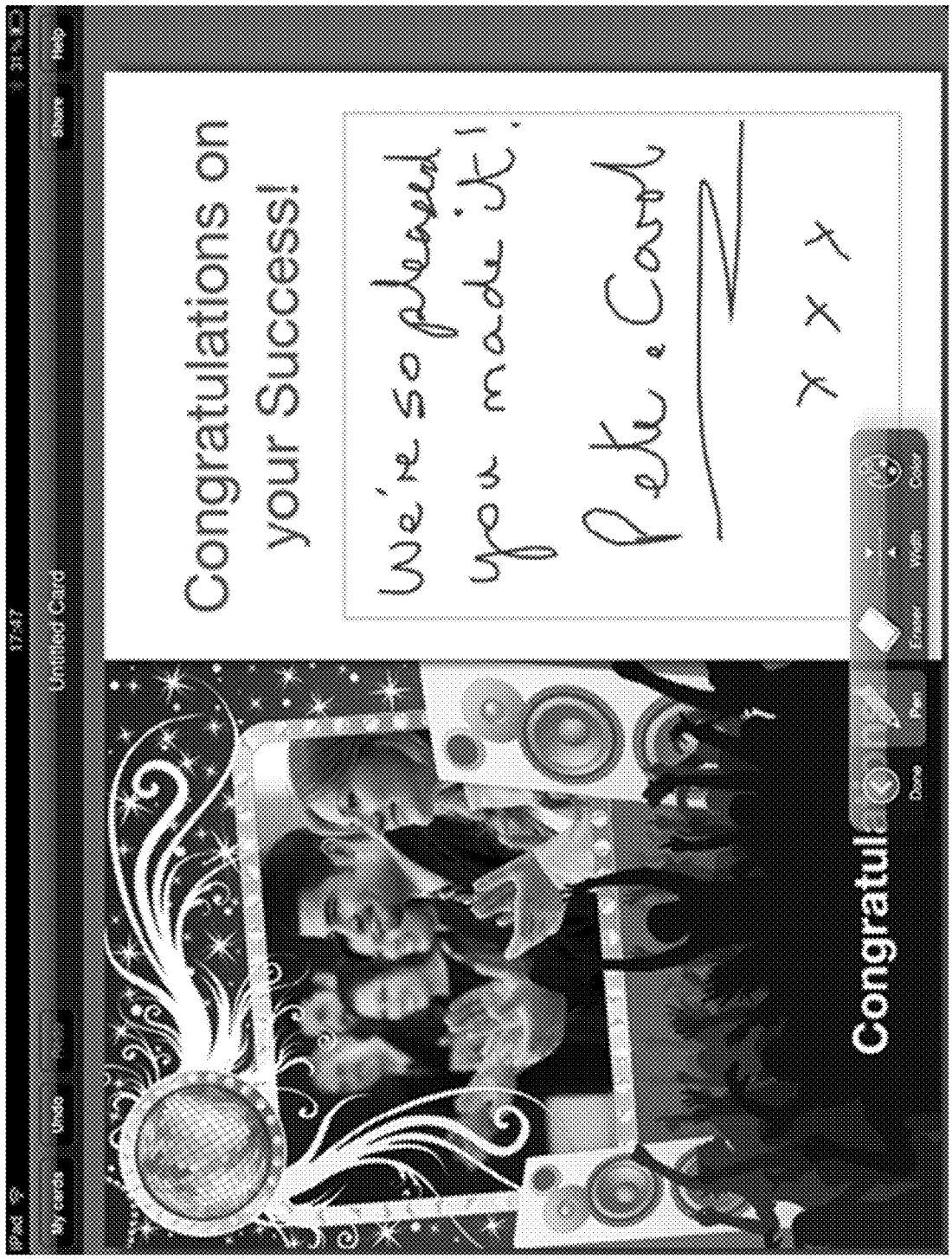
FIGS. 5A and 5B illustrates another example of a user customizing a piece of print media.
Figure 5B:
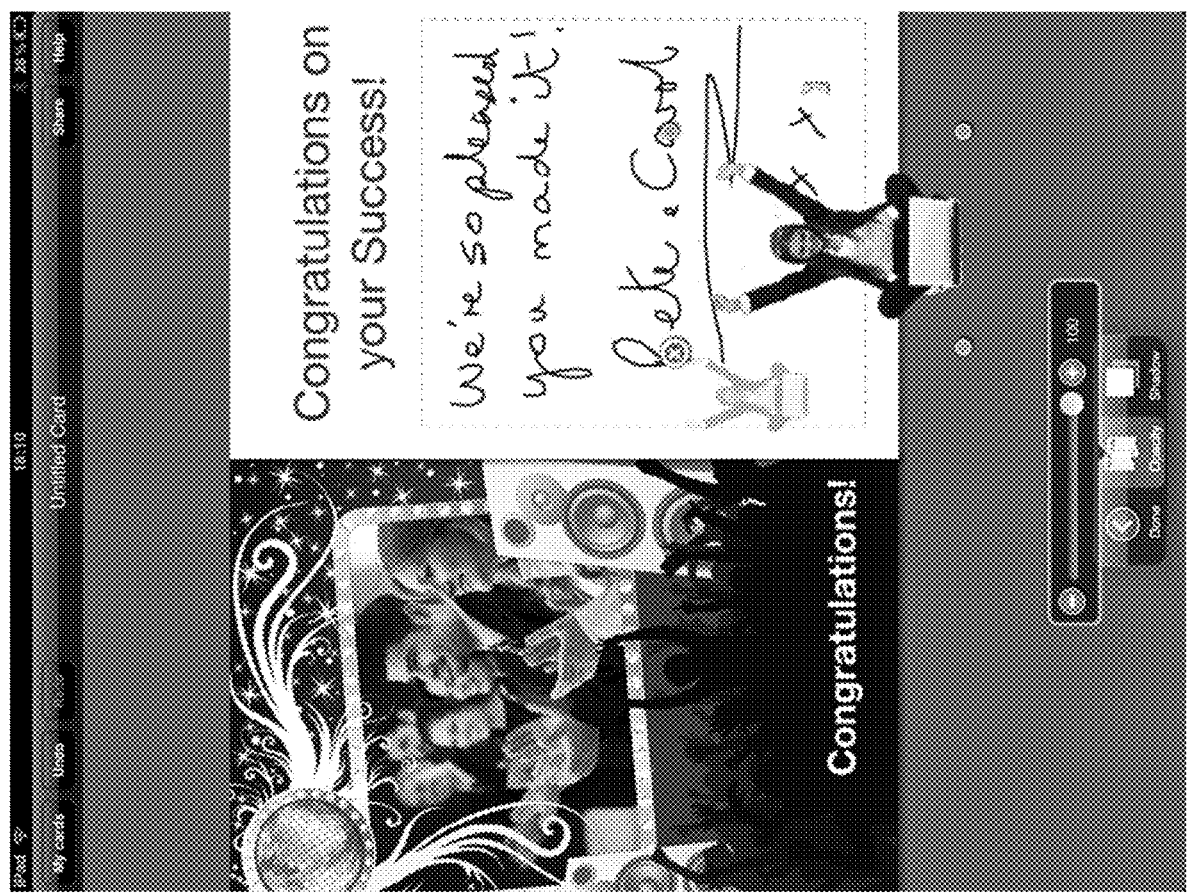

FIGS. 4A-4D are user interface examples of a user customizing a piece of print media. In particular, FIG. 4A shows a template with a text box into which the user may enter text as described above while FIG. 4B shows a template with a text box and an image/phone spot into which the user can insert personalized content. FIG. 4C illustrates a completed template while FIG. 4D illustrates a template with a color palette. FIGS. 5A and 5B illustrates another example of a user customizing a piece of print media.

For example, John takes a photo of his Auntie Joan at her 60th birthday party, using a WiFi enabled camera, linked to the app on his smartphone. This photo is made interactive, in the same way as above, and linked to a video of Joan at the party, also captured on the camera, through the app. John then orders, and pays for, prints of the photograph, to be sent to family members all over the world. These prints are produced remotely since the app sends the information wirelessly to a professional printer, where the photographs are printed and dispatched according to the delivery information entered on the app. These prints are already interactive, as the image is stored and indexed in the cloud component, so any user who scans the photo with the app is taken to the video of Joan at the party.

Interactivity of Existing Printed Media

Figure 6B:
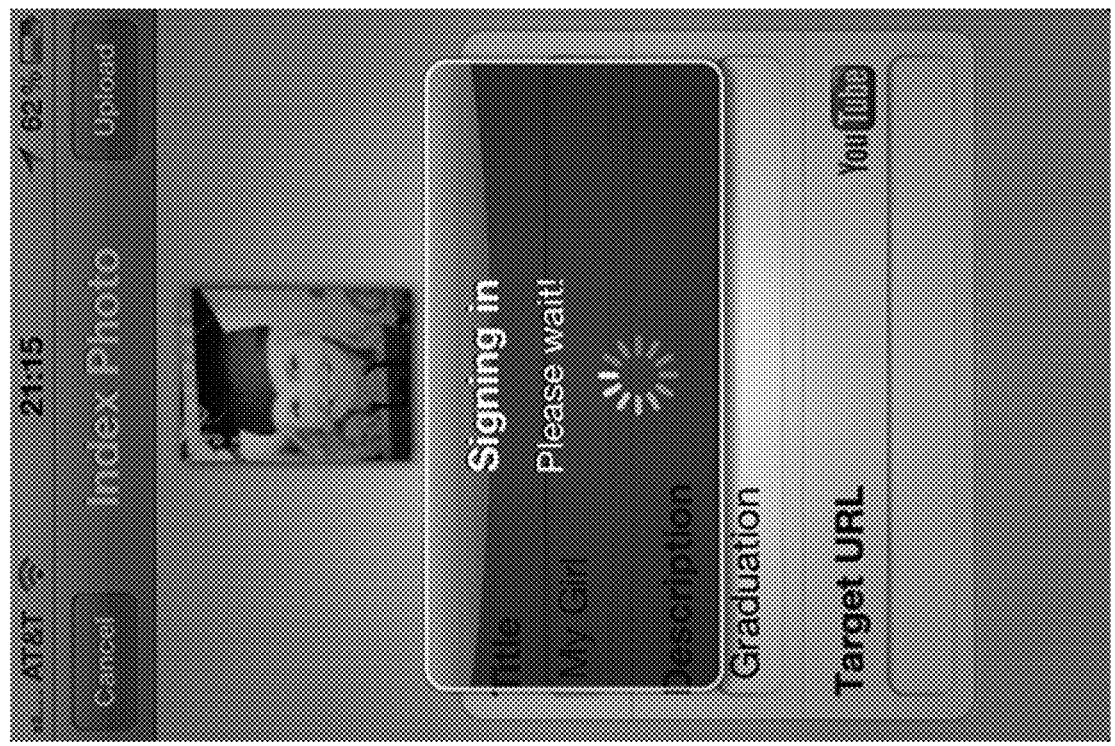
FIGS. 6A-6C illustrate a user indexing an image in the system.
Figure 6A:
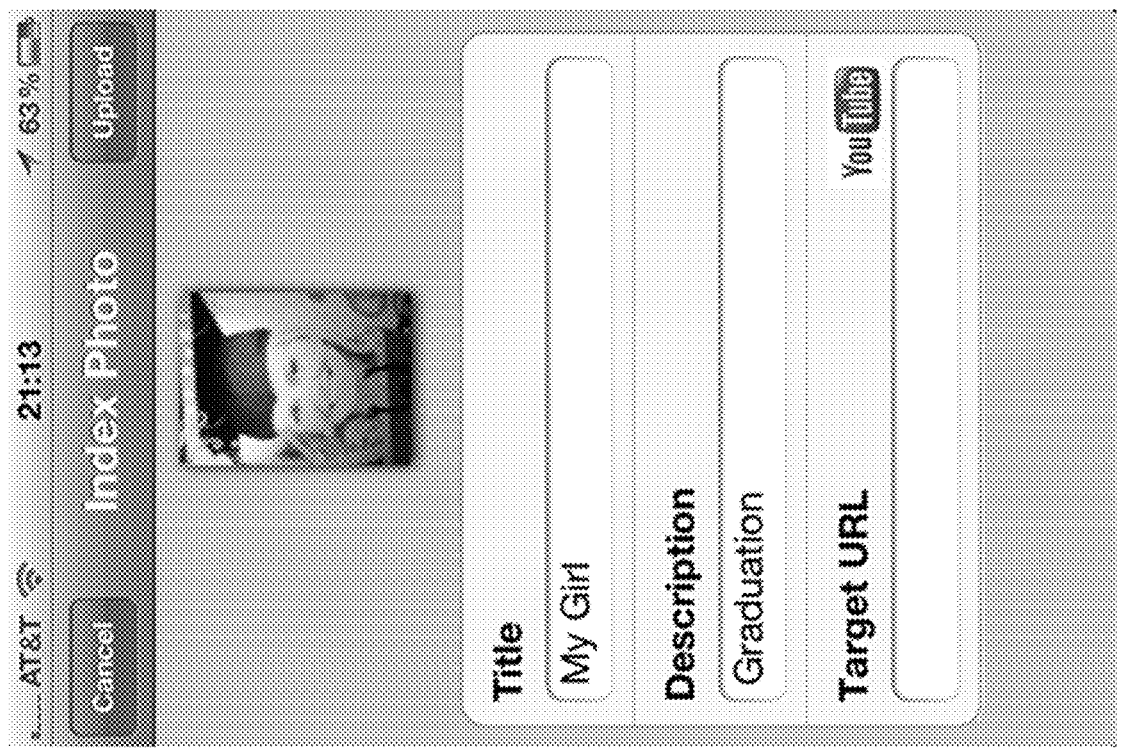
Figure 6C:

FIGS. 6A-6C illustrate a user indexing visual material, such as an image, in the system in which the user uploads an image/phone as in FIG. 6A, signs into the system in FIG. 6B and can also upload a video as shown in FIG. 6C. Specifically, a user may take a photograph of a piece of print media, such as by using a camera of a computing device. Alternatively, the user may select an image already stored on the computing device to use as the piece of printed media. The user may then index the piece of print media as shown in FIG. 6A. When the user is indexing the piece of print media, the user may enter a title of the print media, a description of the piece of print media and a target link, such as a URL, which makes the piece of print media interactive since, when a subsequent user scans the piece of printed media, the subsequent user will be taken to the website pointed to by the URL. For example, the user may scan a poster, assign a link, such as a URL, and then a subsequent user can scan the poster and will be redirected to the target link. As shown in FIG. 6B, when the user uploads the image of the piece of printed media, the user signs in and then the image of the piece of printed media is indexed which makes the piece of printed media interactive since the backend system associates the piece of printed media (that is recognized using known image recognition processes in the backend system) to the target link. Then, when a subsequent user of the system scans the same piece of printed media using the application, the subsequent user is directed to the content, such as a web site or video, etc, associated with the target link. The link that is assigned to the piece of printed media may direct the subsequent user to various content, such as videos, interviews, web sites, photographs, questionnaires, maps and the like.

In the method for making existing printed media interactive, there may be the following processes:

Image capture—Using the app on the computing device, a user creates an interactive image using image recognition technology utilised by the app. This is achieved either by taking a photo of an existing physical image, using any on-board SD, HD, 3D camera on the device (smartphone, tablet, camera) currently in use, or an external wirelessly connected and controlled remote camera or video camera, or other such device, to capture a new image which is to be made interactive, using the interface and functionality of the app. The subject matter can be any relatively planar object, including, but not limited to, photographs, paintings of all varieties, textile items of all varieties (assuming they are of a planar nature) such as clothing and accessories, carpets, wallpapers, tapestries etc., cases, carriers and covers, posters, signs, any printed material etc.

Make interactive—Once captured, a low resolution version of this image is uploaded to the components of the backend system in the cloud and an image recognition process is applied, such that the visual attributes of the image can subsequently be recognised by the scanning system of the app.

Assign destination and further content—The user then assigns the content to be displayed upon scanning of the image. The destination could be any accessible content on the mobile internet, online store, or any online function that is desired. This could take the form of (including, but not limited to) public video or photo sharing platforms such as YouTube, Flickr, etc., private (branded or unbranded) online media storage and sharing platforms etc. The app also has the functionality to create further user-generated content on the fly, that is to say using any on-board SD, HD, 3D camera on the device currently in use, or an external wirelessly connected and controlled remote camera or video camera, or other such device, to capture new content to which the image is to be linked. The new content will be uploaded and stored online, on a public video or photo sharing platform such as YouTube, Flickr, etc., or a private (branded or unbranded) online media storage and sharing platform. The destination, in whatever form, will be accessed from within the app, maintaining the app's appearance, skin, branding, advertising, and any other features.

Read—When the image is subsequently scanned by any device using the app, the image recognition technology follows the directions given by the image in our database, resulting in the pre-assigned media, content or destination being accessed by the app.

For example, a grandson uses the app on his smartphone to take a photo of an existing, framed photograph of his late grandfather. The app uploads a low resolution version of the image of photograph to our database in the cloud, and the image recognition algorithm is applied. The grandson then uses his wireless-enabled digital video camera, which is wirelessly linked to his phone, on which he is using the app, to record a video of his grandmother's memories of his grandfather. The video is transferred to an online media storage platform through the app and the link created between the image of his grandfather, and the video of his grandmother. The grandson's cousin then scans the copy of the photograph of his grandfather that hangs on his wall, in Australia, using the app on his tablet. The cousin is presented with the video of his grandmother' memories of his late grandfather.

Figure 7:
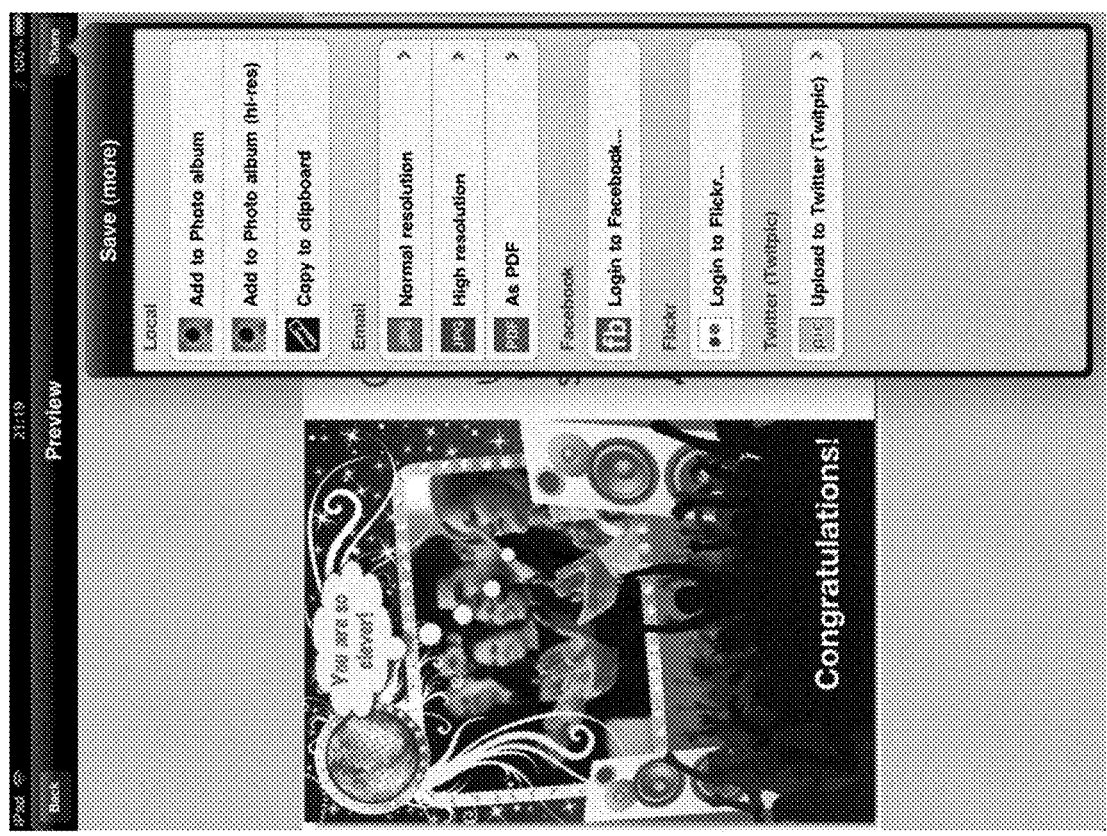
FIG. 7 illustrates a preview function of the system.
Figure 8C:
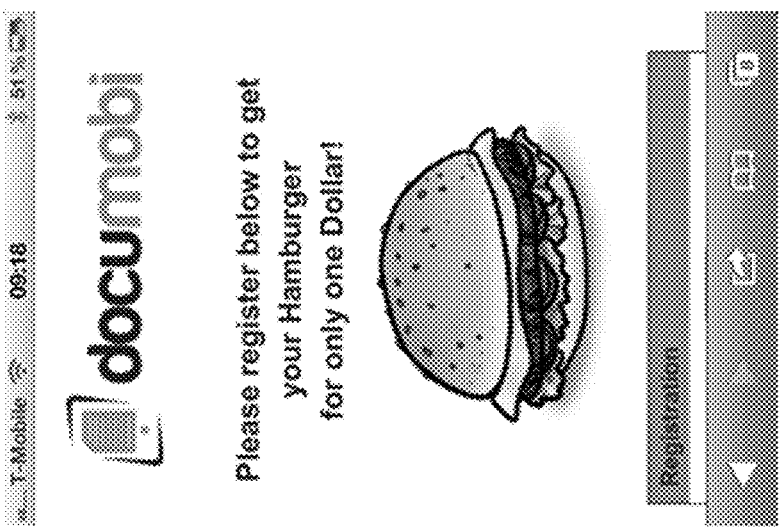
FIGS. 8A-8F show an example of the system being used for a coupon.
Figure 8B:
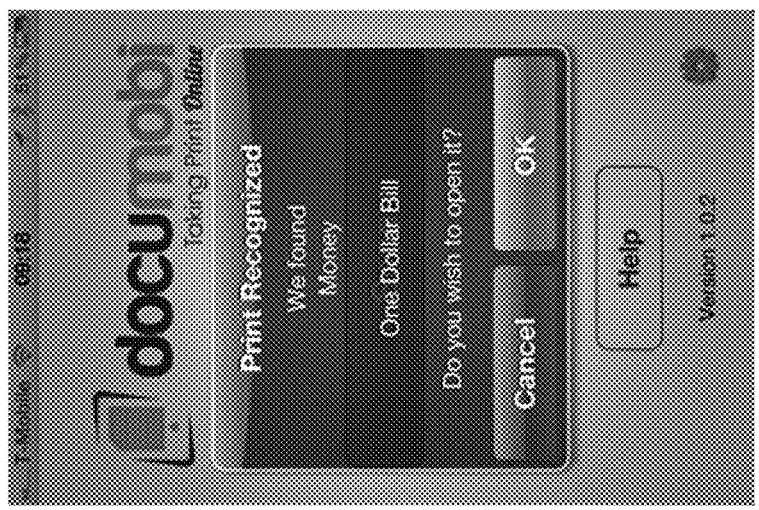
Figure 8A:
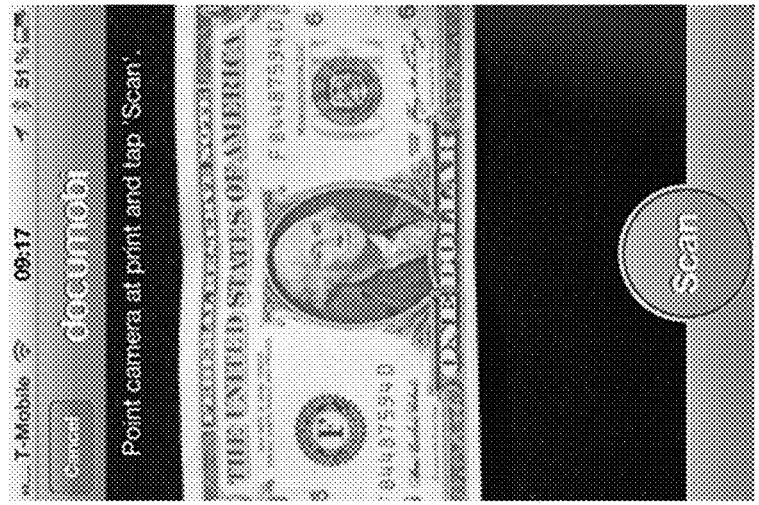
Figures 8D, 8E, 8F:
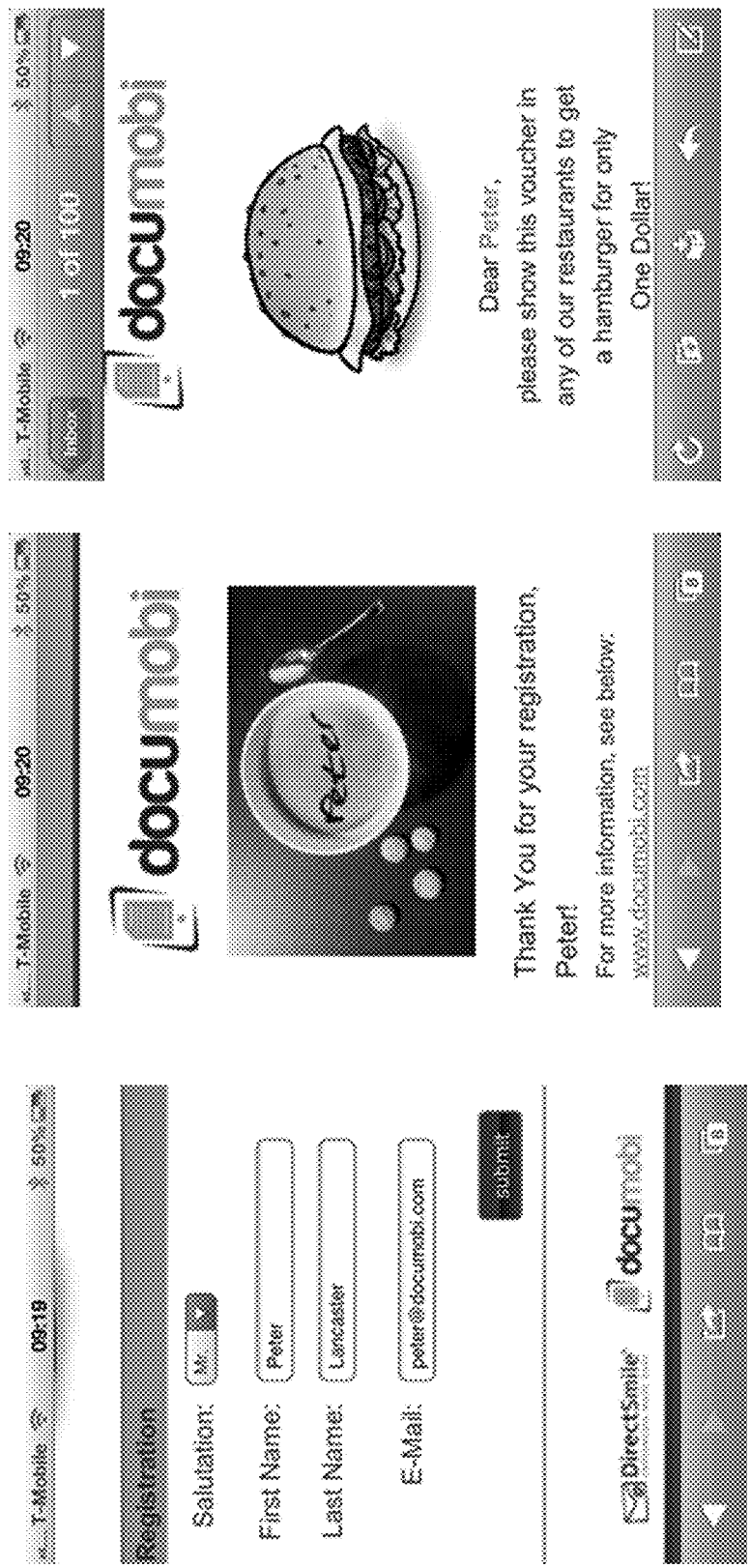

FIG. 7 illustrates a preview function of the system and FIGS. 8A-8F show an example of the system being used for a coupon that is interactive. In the example in FIGS. 8A-8F of the coupon or offer, the user may enter a code into the app of the computing device to receive one of an offer and a coupon.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A system for generating interactive media, comprising:
   a computing device having a processor, memory, an imaging device and a display;
   a backend component coupleable to the computing device over a communication path;
   the computing device being configured to create a piece of content personalized for a targeted recipient;
   the backend component being configured to associate a unique code with the personalized piece of content uploaded from the computing device and provide the unique code to the targeted recipient using a second computing device having a processor, memory, an imaging device and a display; and
   the second computing device being used to scan a generic piece of content, enter the provided unique code and display the personalized piece of content personalized for the targeted recipient in response to the unique code.

2. The system of claim 1, wherein the generic piece of content is one of a poster, a painting, a contact card, a business card, a greetings card, a dating card, a resume card, a save the date card, a trading card, a postcard, a reply card, an event card, a game card, a gift card, a charity card, a photo-book, a canvas print, a hat, a mug, a t-shirt, a pillow, a cushion, a bag, a fridge magnet, a bumper sticker, a label, a painting, a coaster and a photo-jigsaw.

3. The system of claim 2, wherein the personalized piece of content is a video.

4. The system of claim 3, wherein the imaging device is a camera that records the personalized piece of content.

5. A method for generating interactive media, comprising:
   creating, using a computing device having a processor, memory, an imaging device and a display, a piece of content personalized for a targeted recipient;
   associating, by a backend component coupleable to the computing device, a unique code with the personalized piece of content uploaded from the computing device;
   providing, by the backend component to the targeted recipient using a second computing device having a processor, memory, an imaging device and a display, the unique code;
   scanning, using the second computing device, a generic piece of content;
   entering, on the second computing device by the targeted recipient, the provided unique code; and displaying, on the second computing device, the personalized piece of content personalized for the targeted recipient in response to the unique code.

6. The method of claim 5, wherein the generic piece of content is one of a poster, a painting, a contact card, a business card, a greetings card, a dating card, a resume card, a save the date card, a trading card, a postcard, a reply card, an event card, a game card, a gift card, a charity card, a photo-book, a canvas print, a hat, a mug, a t-shirt, a pillow, a cushion, a bag, a fridge magnet, a bumper sticker, a label, a painting, a coaster and a photo-jigsaw.

7. The method of claim 6, wherein the personalized piece of content is a video.

8. The method of claim 7, wherein the imaging device is a camera that records the personalized piece of content.

9. An apparatus, comprising:
a computer system having a processor, memory and a plurality of lines of code configured to:
receive a personalized piece of media personalized for a targeted recipient from a computing device;
associate a unique code with the personalized piece of media received from a computing device; and
provide, to a targeted recipient using a second computing device having a processor, memory, an imaging device and a display, the unique code so that the targeted recipient scans a generic piece of content, enters the provided unique code and displays the personalized piece of content personalized for the targeted recipient in response to the unique code.

10. The apparatus of claim 9, wherein the generic piece of content is one of a poster, a painting, a contact card, a business card, a greetings card, a dating card, a resume card, a save the date card, a trading card, a postcard, a reply card, an event card, a game card, a gift card, a charity card, a photo-book, a canvas print, a hat, a mug, a t-shirt, a pillow, a cushion, a bag, a fridge magnet, a bumper sticker, a label, a painting, a coaster and a photo-jigsaw.

11. The apparatus of claim 10, wherein the personalized piece of content is a video.

12. The apparatus of claim 11, wherein the imaging device is a camera that records the personalized piece of content.

* * * * *